United States Patent
Hunsicker

(10) Patent No.: US 11,597,124 B1
(45) Date of Patent: Mar. 7, 2023

(54) METHOD OF TREATING POST-TENSIONING STRAND WEDGES WITH INDUCTION HEATING

(71) Applicant: Gregory Alan Hunsicker, Dallas, TX (US)

(72) Inventor: Gregory Alan Hunsicker, Dallas, TX (US)

( * ) Notice: Subject to any disclaimer, the term of this patent is extended or adjusted under 35 U.S.C. 154(b) by 492 days.

(21) Appl. No.: 16/878,361

(22) Filed: May 19, 2020

Related U.S. Application Data

(60) Provisional application No. 62/850,339, filed on May 20, 2019.

(51) Int. Cl.
*E04C 5/12* (2006.01)
*B29C 35/08* (2006.01)
*H05B 6/00* (2006.01)
*H05B 6/10* (2006.01)

(52) U.S. Cl.
CPC .......... *B29C 35/0805* (2013.01); *E04C 5/122* (2013.01); *H05B 6/00* (2013.01); *H05B 6/10* (2013.01); *B29C 2035/0811* (2013.01)

(58) Field of Classification Search
CPC ............. B29C 35/0805; B29C 35/0811; B29C 2035/0811; E04C 5/10; E04C 5/12; E04C 5/122; E04C 5/127; H05B 6/00; H05B 6/10
See application file for complete search history.

(56) References Cited

U.S. PATENT DOCUMENTS

| | | | | |
|---|---|---|---|---|
| 4,773,198 A * | 9/1988 | Reinhardt | ............... | E04C 5/122 52/223.13 |
| 5,141,356 A * | 8/1992 | Chaize | .................... | E04C 5/122 403/368 |
| 5,755,065 A * | 5/1998 | Sorkin | ...................... | E04C 5/12 52/223.13 |
| 6,027,278 A * | 2/2000 | Sorkin | .................... | E04C 5/122 403/374.1 |
| 7,797,895 B1 * | 9/2010 | Sorkin | .................... | E04C 5/122 403/374.1 |
| 7,841,140 B1 * | 11/2010 | Sorkin | .................... | E04C 5/122 403/374.1 |
| 8,756,885 B1 * | 6/2014 | Mathews | ................. | E04C 5/122 52/223.13 |
| 2006/0117683 A1 * | 6/2006 | Hayes | ...................... | E04C 5/122 52/223.13 |
| 2009/0205273 A1 * | 8/2009 | Hayes | ...................... | E04C 5/127 52/223.13 |
| 2017/0016233 A1 * | 1/2017 | Sorkin | .................... | E04C 5/122 |
| 2017/0343078 A1 * | 11/2017 | Manabe | ................ | F16G 11/048 |

* cited by examiner

*Primary Examiner* — Hung D Nguyen

(74) *Attorney, Agent, or Firm* — Plager Schack LLP; Mark H. Plager; Eric Liou

(57) ABSTRACT

A method of heat treating post-tensioning strand wedges that enhances efficiency, repeatability and safety is provided. The method includes providing a plurality of post-tensioning strand wedges, transporting each post-tensioning strand wedge to a heating assembly having a first induction heater, heating each post-tensioning strand wedge using the first induction heater of the heating assembly to form a heated post-tensioning strand wedge in a plurality of heated post-tensioning strand wedges, and delivering the plurality of heated post-tensioning strand wedges to perform a series of actions.

10 Claims, 4 Drawing Sheets

METHOD OF TREATING POST-TENSIONING STRAND WEDGES WITH INDUCTION HEATING

RELATED APPLICATION

The application claims priority to provisional patent application U.S. Ser. No. 62/850,339 filed on May 20, 2019, the entire contents of which is herein incorporated by reference.

BACKGROUND

The embodiments herein relate generally to post-tensioning strand wedges. More specifically, embodiments of the invention are directed to a method of heat treating post-tensioning strand wedges to enhance efficiency, repeatability and safety.

Post-tensioned concrete is used to construct structures such as buildings, bridges, homes, or other structures. In these applications, a plurality of steel strands are often disposed throughout the concrete and secured in place by post-tensioning strand wedges to reinforce the slabs. The post-tensioning strand wedges typically have been heat treated prior to their use.

Current methods and systems for heat treating wedges for post-tensioning typically involve cumbersome and expensive equipment that is very dependent on the workmanship and knowledge of the process. Specifically, this heat treat operation is very complicated and therefore lends itself to problems if the ideal atmosphere, temperatures, times, processes and other variables are not followed. Moreover, the current devices used to heat treat wedges heat treat many parts at the same time. If the parts are not arranged correctly, there can be inconsistencies in the quality of the final treated wedges.

As such, there is a need in the industry for a system and method of heat treating post-tensioning strand wedges that addresses the limitations of the prior art, which enhances efficiency, repeatability, safety and quality of the final product.

SUMMARY

In certain embodiments of the invention, a method of heat treating post-tensioning strand wedges that enhances efficiency, repeatability and safety is provided. The method comprises providing a plurality of post-tensioning strand wedges, transporting each post-tensioning strand wedge in the plurality of post-tensioning strand wedges to a heating assembly comprising a first induction heater, heating each post-tensioning strand wedge in the plurality of post-tensioning strand wedges using the first induction heater of the heating assembly to form a heated post-tensioning strand wedge in a plurality of heated post-tensioning strand wedges, and delivering the plurality of heated post-tensioning strand wedges to perform a series of actions.

In certain embodiments, the series of actions comprises quenching the plurality of heated post-tensioning strand wedges in a fluid to form a plurality of final heat treated post-tensioning strand wedges, performing a quality control procedure on the plurality of final heat treated post-tensioning strand wedges, and sorting the plurality of final heat treated post-tensioning strand wedges for distribution.

BRIEF DESCRIPTION OF THE FIGURES

The detailed description of some embodiments of the invention will be made below with reference to the accompanying figures, wherein the figures disclose one or more embodiments of the present invention.

FIG. 1 depicts a flowchart of a method of heat treating post-tensioning strand wedges in accordance with certain embodiments of the invention;

FIG. 2 depicts a perspective view of a pair of wedges 40 used in certain embodiments of the invention;

FIG. 3 depicts a schematic side elevation view of certain embodiments of the invention;

FIG. 4A depicts a longitudinal side schematic view of certain embodiments of the invention illustrating the handling of wedges 40 on a conveyor;

FIG. 4B depicts a cross-sectional view of certain embodiments of the invention, taken along line 4B-4B in FIG. 4A;

FIG. 5A depicts a longitudinal side schematic view of an alternative embodiment of the invention illustrating the handling of wedges 40 on a conveyor.

FIG. 5B depicts a cross-sectional view of certain embodiments of the invention, taken along line 5B-5B in FIG. 5A;

FIG. 6 depicts a schematic side view of certain embodiments of the invention illustrating the pick and place handling of wedges 40;

FIG. 7A depicts a side cross-sectional view of certain embodiments of the invention illustrating the handling of wedge 40 in an upright orientation;

FIG. 7B depicts a front view of an alternative embodiment of the invention illustrating the handling of wedge 40 in the upright orientation;

FIG. 7C depicts a front view of another alternative embodiment of the invention illustrating the handling of wedge 40 in the upright orientation;

FIG. 8 depicts a perspective view of certain embodiments of the invention illustrating pre-split frustoconical-shaped member 30;

FIG. 8A depicts a perspective view of certain embodiments of the invention illustrating the handling of pre-split frustoconical-shaped member 30 in a first upright orientation; and FIG. 8B depicts a perspective view of certain embodiments of the invention illustrating the handling of pre-split frustoconical-shaped member 30 in a second upright orientation.

DETAILED DESCRIPTION OF CERTAIN EMBODIMENTS

In certain embodiments of the invention as depicted in FIGS. 1-3, method 10 of heat treating post-tensioning strand wedges 40 is provided to enhance efficiency, repeatability and safety. In certain embodiments, the method generally comprises a series of steps that heat post-tensioning strand wedges 40 using induction heating and subsequently process the wedges for distribution.

In one embodiment as depicted in FIGS. 2 and 8, post-tensioning strand wedges 40 (hereinafter referred to as "wedge" or wedges") are formed by slicing frustoconical-shaped member 30 into a pair of symmetric halves. Each symmetric half of sliced frustoconical-shaped member 30 forms wedge 40. In an alternative embodiment, it shall be appreciated that frustoconical-shaped member 30 can be sliced into any alternative number of pieces to form wedges 40 having different sizes and shapes.

In one embodiment as depicted in FIGS. 2 and 8, frustoconical-shaped member 30 comprises a height of approximately 1.20"-1.80", an outer diameter of approximately 1"-1.2" at bottom surface 44, and an inner diameter of threaded cutout 48 of approximately 0.380"-0.620". However, frustoconical-shaped member 30 can have variable dimensions in alternative embodiments.

Figure 2:
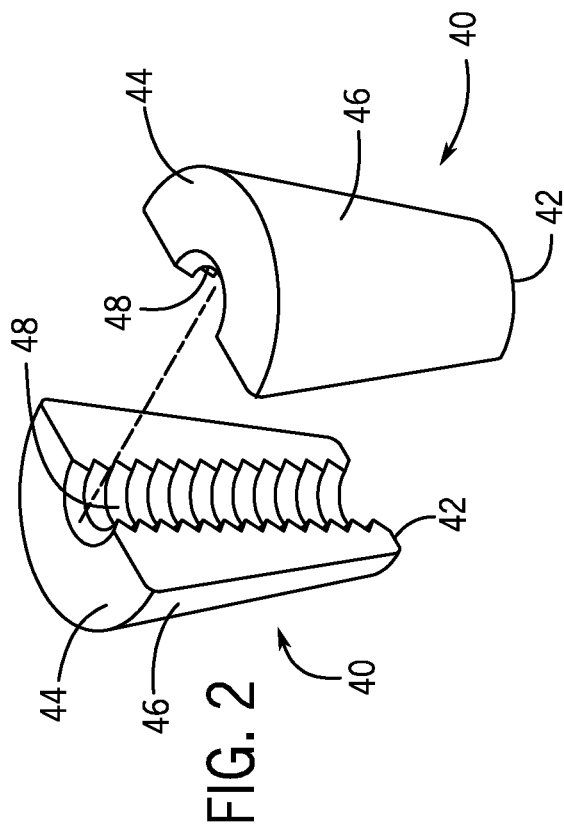

In one embodiment as depicted in FIG. 2, each wedge 40 comprises top surface 42 connected to bottom surface 44 by slanted side surface 46. Threaded cutout 48 extends longitudinally through wedge 40 from top surface 42 to bottom surface 44. In one embodiment, wedges 40 are made from any type of steel such as AISI 12L14, 11L17 and 1215 varieties. In an alternative embodiment, wedges 40 can be made from other types of steel, ductile cast iron or other metals.

Figure 1:
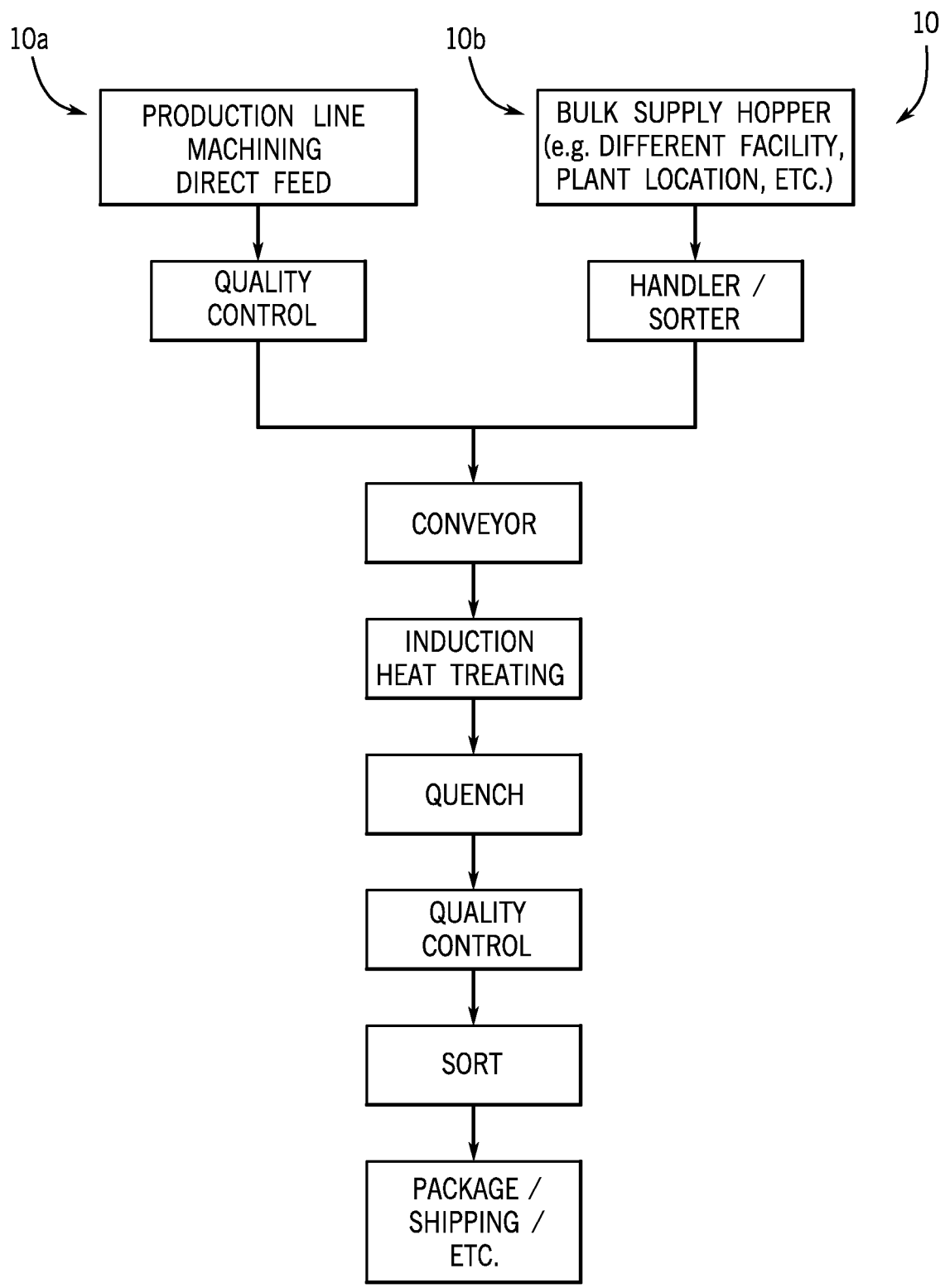

In one embodiment as depicted in FIG. 1, method 10 begins with first initial method 10a or second initial method 10b.

In one embodiment, first initial method 10a is performed, which comprises providing a plurality of wedges 40 from a production line that uses direct feed machining to machine and slice frustoconical-shaped members 30 into wedges 40 and directly transport the wedges to the heat treating portion of the production line. In one embodiment, one or more CNC machines are used to form threaded cutout 48 in frustoconical-shaped member 30 and subsequently slice the member into wedges 40.

In one embodiment, the formed wedges 40 are sent through a quality control procedure that verifies the correct dimensions of each wedge, and confirms the presence of threaded cutout 48 in the wedge with the desired sharpness, spacing of the threads and/or other criteria. The quality control procedure is performed manually or using techniques such as automated optical scanning technology. Wedges 40 that do not pass the quality control procedure are removed from the batch of finished items. In one embodiment as depicted in FIGS. 1 and 3, the acceptable wedges 40 are transferred to, or moved along, conveyor 14 for further processing.

Figure 3:
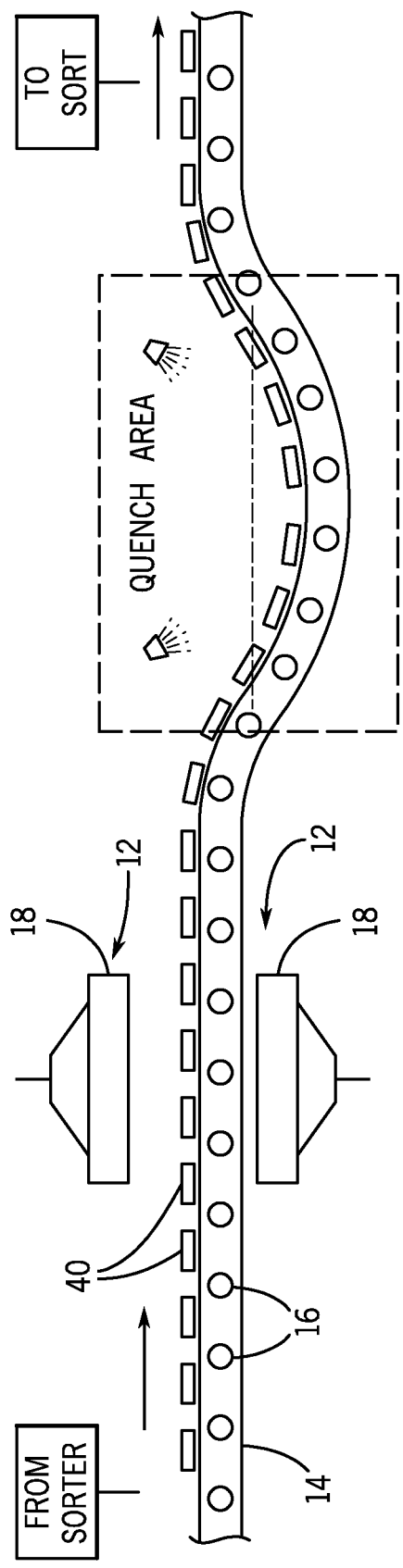

In an alternative embodiment as depicted in FIGS. 1 and 3, second initial method 10b is performed, which comprises providing a plurality of wedges 40 into a bulk supply hopper that can be present at different facilities, plant locations and the like. In one embodiment, wedges 40 are purchased from any supplier, merchant or other party. In one embodiment, a quality control procedure is performed prior to providing wedges 40 to the hopper.

In one embodiment as depicted in FIGS. 1 and 3, the plurality of wedges 40 are transported from the hopper to a handler and/or sorter to prepare the wedges for heat treatment. The handler and/or sorter separates wedges 40 into different batches if required, and places wedges in the proper orientation for conveyor 14. In one embodiment, the acceptable wedges 40 in first initial method 10a are also sent to a handler and/or sorter to prepare wedges 40 in the proper orientation for conveyor 14 and the heat treatment process.

In certain embodiments as depicted in FIGS. 1 and 3, conveyor 14 generally transports wedges 40 to heating assembly 12 to be heated by one or more induction heaters 18, a quench area to quench the heated wedges 40, and subsequent locations to perform a quality control procedure on wedges 40, and finally sort, package and ship wedges 40 for a distribution. In one embodiment, conveyor 14 comprises a rotary belt or table having a plurality of rollers 16.

Figure 4A:
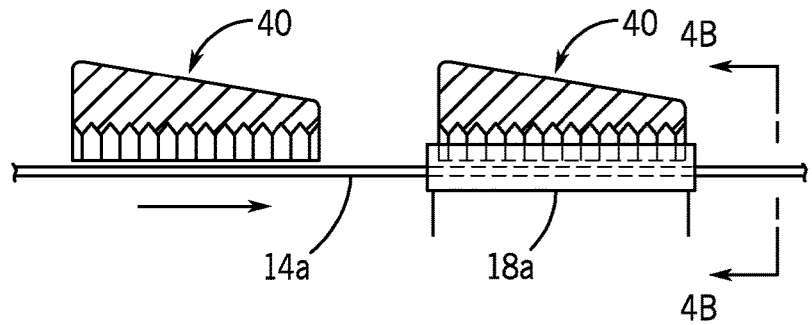
Figure 4B:
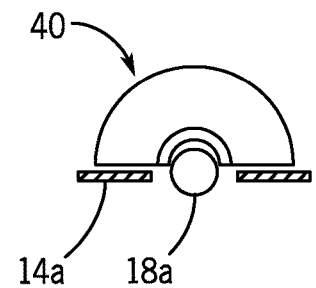

In one embodiment as depicted in FIGS. 3 and 4A-4B, wedges 40 are transported on first exemplary conveyor 14a, which transports wedges 40 to first exemplary induction heater 18a. During this time, each wedge 40 is transported with its longitudinal axis oriented parallel to first exemplary conveyor 14a and threaded cutout 48 faced down toward the conveyor. As first exemplary conveyor 14a transports each wedge 40 over first exemplary induction heater 18a, threaded cutout 48 of wedge 40 is induction heated. First exemplary conveyor 14a transports the heated wedge 40 to the quench area. At the same time, first exemplary conveyor 14a transports the successive wedge 40 in line over first exemplary induction heater 18a. This process is repeated to heat all wedges 40 on conveyor 14.

Figure 5A:
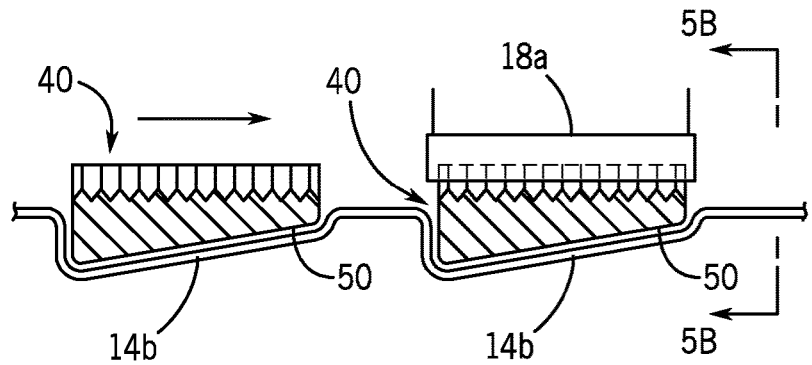
Figure 5B:
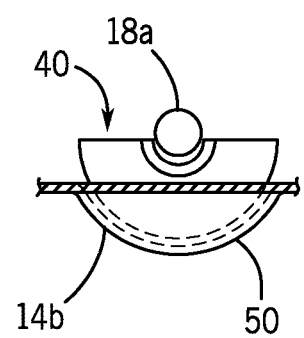

In an alternative embodiment as depicted in FIGS. 5A-5B, second exemplary conveyor 14b is used to transport wedges 40 to first exemplary induction heater 18a. In this embodiment, second exemplary conveyor 14b comprises a plurality of recesses 50 configured to secure the plurality of wedges 40 therein. Each recess 50 in conveyor 14b is configured to support a single wedge 40. During this time, each wedge 40 is transported with its longitudinal axis oriented parallel to second exemplary conveyor 14b, and threaded cutout 48 faced up and away from conveyor 14. First exemplary induction heater 18a is secured overhead to align with threaded cutout 48 with each passing wedge 40. It shall be appreciated that second exemplary conveyor 14b is advantageous because recesses 50 securely fasten wedges 40 and prevent them from inadvertently sliding out of place or in the wrong orientation during the heating process.

In an alternative embodiment as depicted in FIG. 3, it shall be appreciated that one or more additional induction heaters 18 can be used in heating assembly 12 to heat each wedge 40 on both opposing upper and lower sides simultaneously. Induction heaters 18 can be secured in place near conveyor 14 using any support frames, mounting brackets, clamps or other components. It shall be appreciated that induction heaters 18 can be any type of induction heaters in the field.

In one embodiment as depicted in FIG. 3, heated wedges 40 are transported on conveyor 14 to a quench area. In the quench area, the plurality of heated wedges 40 are transferred to a tank of oil or other fluid, or alternate location to be sprayed with or submerged in oil or other fluid. This rapidly cools heated wedges 40 to form final heat treated wedges 40. Final heat treated wedges 40 are transported on conveyor 14 to another location to perform a quality control procedure on wedges 40, and to sort, package and ship wedges 40 to a desired destination.

Figure 6:
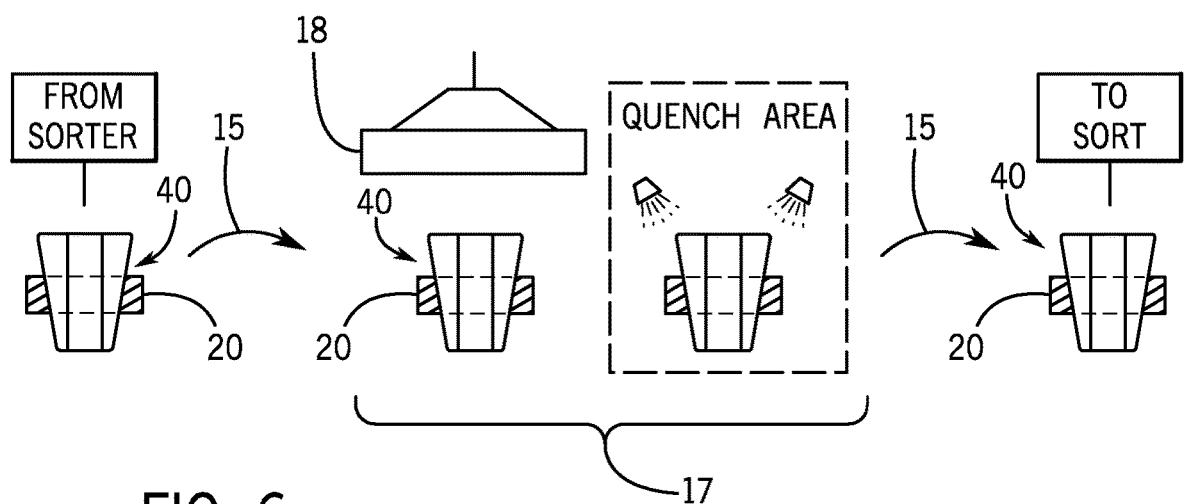

In an alternative embodiment as depicted in FIGS. 3 and 6, conveyor 14 is replaced with pick and place handling 15 to transport wedges 40 to heating assembly 12 and the quench area. In this embodiment, treatment area 17 comprises a single convenient location where wedges 40 are heated by induction heater 18 and cooled in the quench area. In one embodiment, pick and place handling 15 is performed with holding block 20 having a central opening, which is configured to secure one or more wedges 40 in an upright position. Holding block 20 is made from metal, ceramic or other materials.

In one embodiment, holding block 20 and any secured wedges 40 thereon are transported via pick and place handling 15 to a case in treatment area 17 for heat treating and quenching. Holding block 20 can be manually transported to treatment area 17 or maneuvered using equipment such as automated robotic arms or other components.

Figures 7A, 7B, 7C:
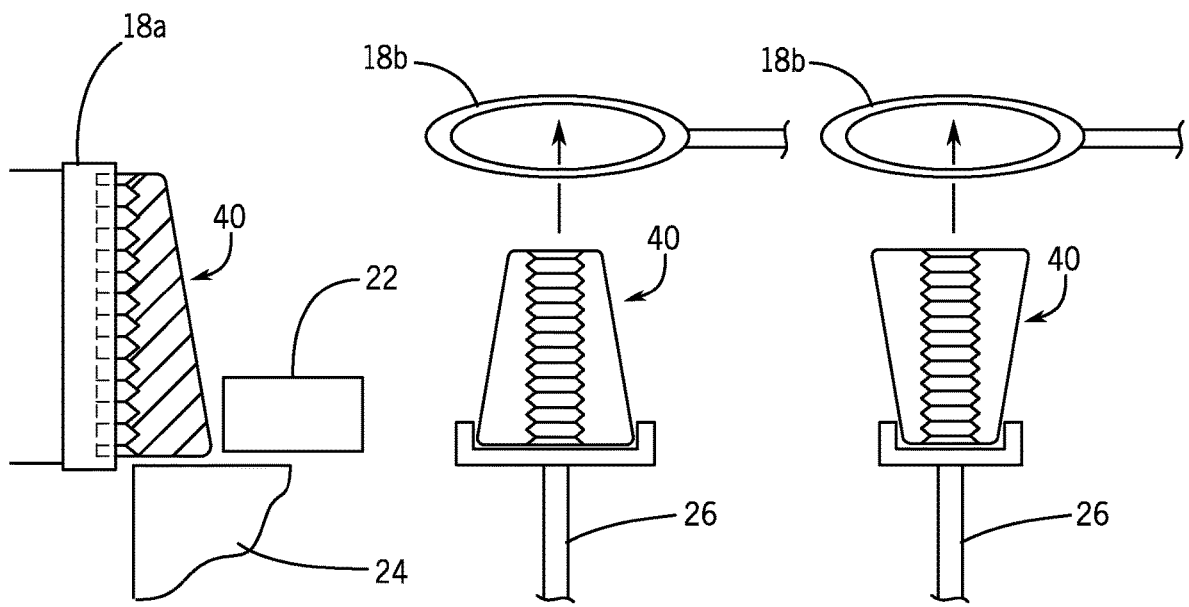

In one embodiment as depicted in FIG. 7A, holding block 20 releases wedge 40 in an upright position on moving shelf 24, which maneuvers wedge 40 to the proper alignment with first exemplary induction heater 18a. First induction heater 18a heats threaded cutout 48 of wedge 40. Moving shelf 24 subsequently transports heated wedge 40 to the quench area in treatment area 17 to complete a quenching procedure. In one embodiment, fixed stop 22 is disposed on moving shelf 24 to help maintain wedge 40 in the desired upright position during transport and the heating process.

In an alternative embodiment as depicted in FIG. 7B, holding block 20 releases wedge 40 in an upright position on pedestal 26. Pedestal 26 is manually fed through second exemplary induction heater 18b in the direction as shown by the arrow. Alternatively, an actuator can be used to actuate pedestal 26 linearly through second exemplary induction heater 18b.

Wedge 40 is heated as it extends through second exemplary induction heater 18b. Although wider bottom surface 44 of wedge 40 is shown disposed on pedestal 26, it shall be appreciated that top surface 42 of wedge 40 can be disposed on pedestal 26 in an alternative embodiment as depicted in FIG. 7C. In this secondary orientation, wedge 40 is fed through second exemplary induction heater 18b in the same manner previously described.

As depicted in FIG. 7B, the orientation of wedge 40 with bottom surface 44 in contact with pedestal 26 is advantageous to enhance stability of the wedge during the heating process. As depicted in FIG. 7C, although wedge 40 is less stable with top surface 42 in contact with pedestal 26, wedge 40 in this orientation allows a user or equipment such as robotic arms to more easily grasp heated wedge 40 from pedestal 26 and transport it to the quench area.

Figures 8, 8A, 8B:
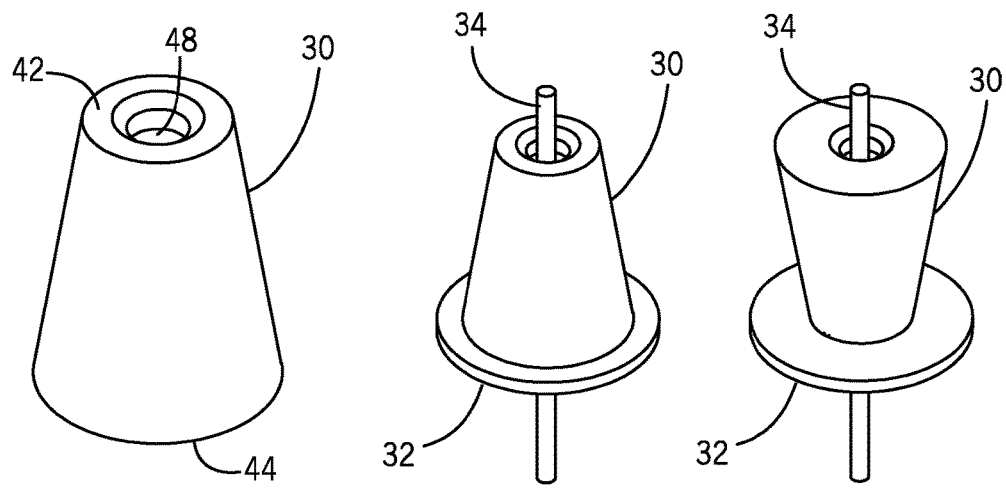

In an alternative embodiment as depicted in FIGS. 8A-8B, pick and place handling 15 is performed using frustoconical-shaped member 30. In this embodiment, frustoconical-shaped member 30 is heated and quenched at treatment area 17, then sliced into wedges 40 at a later time. In one embodiment, alternate pedestal 32 is slidably mounted to rod 34. Alternate pedestal 32 is configured to slidably adjust relative to rod 34 to maneuver frustoconical-shaped member 30 past one or more induction heaters 18. It shall be appreciated that alternate pedestal 32 can slidably adjust along rod 34 manually or via an actuator.

In one embodiment as depicted in FIGS. 1, 3 and 6, final heat treated wedges 40 are transported to a location to perform a quality control procedure on the wedges. In one embodiment, the quality control procedure comprises confirming the heat treatment of wedges 40 is performed properly and testing the hardness of wedges 40 to ensure they fall within acceptable limits or ranges. The quality control procedure is performed manually or through the use of an automated procedure using machinery, tools and/or other equipment. In one embodiment, final heat treated wedges 40 that do not comply with the requirements established in the quality control procedure are removed from the batch.

In one embodiment, final heat treated wedges 40 that pass quality control are transported to be sorted and/or handled. During this time, final heat treated wedges 40 are labeled, identified and/or tracked using an ID number or the like. In one embodiment, final heat treated wedges 40 are sorted into batches to be packaged in boxes, containers and the like. Finally, packaged final heat treated wedges 40 are shipped and distributed to the desired destination, e.g., the merchant, consumer, etc.

By using induction heating, the process described in embodiments of the invention is more controlled treating the wedges individually or in small groups, which allows for a quicker, more efficient and more consistent process. Thus, the process of heat treating the post-tensioning strand wedges using induction heating enhances repeatability, efficiency, safety and the quality of the final product.

It shall be appreciated that the method described in several embodiments herein may comprise any alternative steps and use components made from any known materials in the field and having variable colors, sizes and/or dimensions. It shall be appreciated that the components used in the method described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A method of heat treating post-tensioning strand wedges that enhances efficiency, repeatability and safety, the method comprising:
   providing a plurality of post-tensioning strand wedges, each post tensioning strand wedge in the plurality of post-tensioning strand wedges comprising one of a pair of symmetrical halves of a frustoconical-shaped member comprising a top surface connected to a bottom surface by a slanted side surface, the frustoconical-shaped member comprising a threaded cutout extending longitudinally from the top surface to the bottom surface;
   transporting each post-tensioning strand wedge in the plurality of post-tensioning strand wedges to a heating assembly comprising a first induction heater;
   heating each post-tensioning strand wedge in the plurality of post-tensioning strand wedges using the first induction heater of the heating assembly to form a heated post-tensioning strand wedge in a plurality of heated post-tensioning strand wedges; and
   delivering the plurality of heated post-tensioning strand wedges to perform a series of actions.

2. The method of claim 1, wherein the series of actions comprises quenching the plurality of heated post-tensioning strand wedges in a fluid to form a plurality of final heat treated post-tensioning strand wedges.

3. The method of claim 2, wherein the series of actions comprises performing a quality control procedure on the plurality of final heat treated post-tensioning strand wedges.

4. The method of claim 3, wherein the series of actions comprises sorting the plurality of final heat treated post-tensioning strand wedges for distribution.

5. The method of claim 4, wherein transporting each post-tensioning strand wedge in the plurality of post-tensioning strand wedges comprises disposing the post-tensioning strand wedge on a conveyor.

6. The method of claim 5, wherein the conveyor comprises a plurality of recesses configured to secure the plurality of post-tensioning strand wedges, each recess in the plurality of recesses configured to support one of the plurality of post-tensioning strand wedges.

7. The method of claim 5, further comprising orienting each post-tensioning strand wedge in the plurality of post-tensioning strand wedges so that a longitudinal axis of the post-tensioning strand wedge is parallel to the conveyor.

8. The method of claim 5, wherein the conveyor comprises a holding block that secures the post-tensioning strand wedge in an upright position.

9. The method of claim 5, wherein heating each post-tensioning strand wedge in the plurality of post-tensioning strand wedges comprises aligning the first induction heater in the heating assembly with the threaded cutout of the post-tensioning strand wedge.

10. The method of claim 9, wherein heating each post-tensioning strand wedge in the plurality of post-tensioning strand wedges comprises aligning a second induction heater in the heating assembly with the slanted side surface of the post-tensioning strand wedge.

\* \* \* \* \*